UNITED STATES PATENT OFFICE.

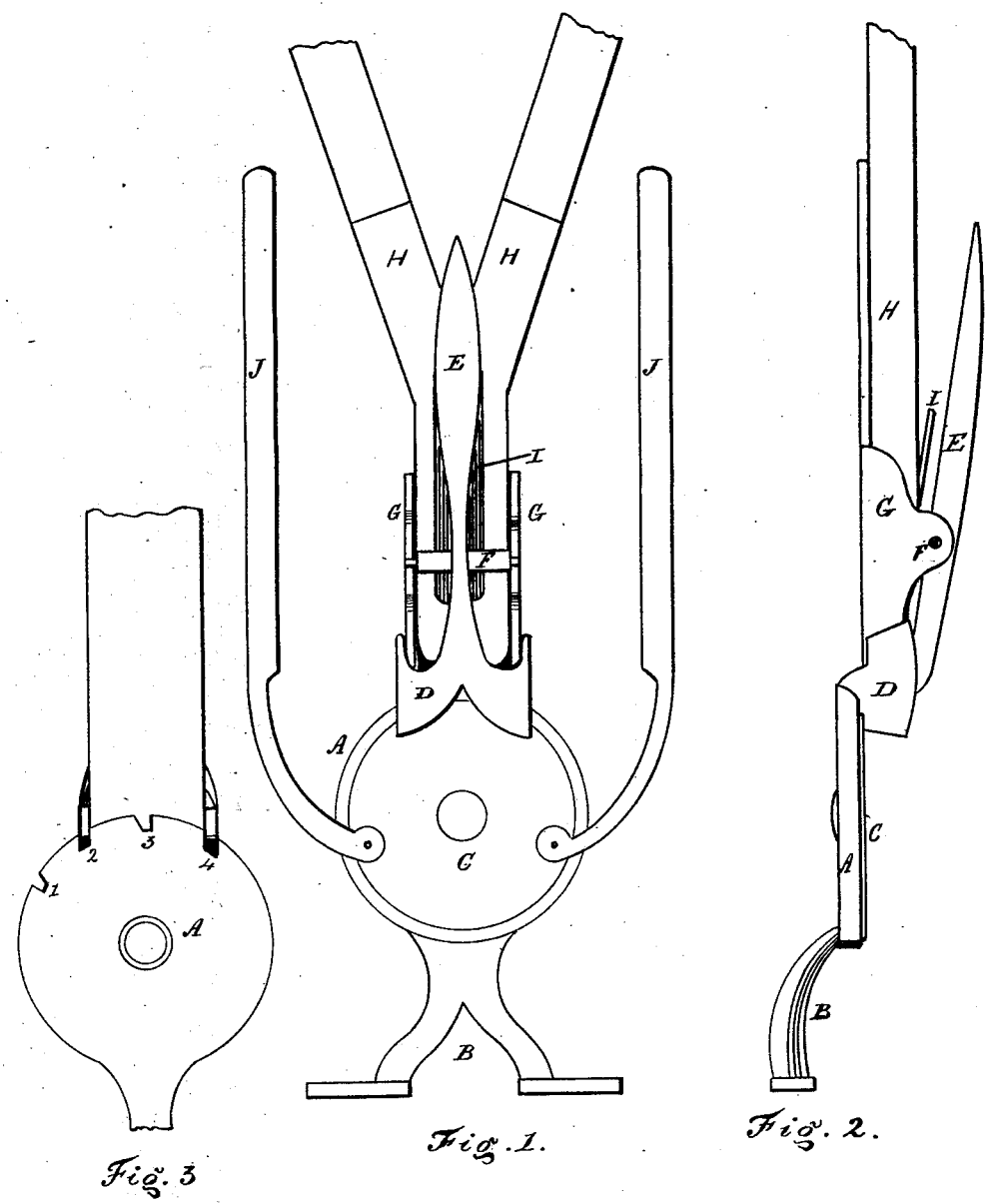

THOMAS SMITH, OF WESTMINSTER TOWNSHIP, COUNTY OF MIDDLESEX, ONTARIO, CANADA.

CARRIAGE-TOP.

SPECIFICATION forming part of Letters Patent No. 236,852, dated January 18, 1881.

Application filed November 20, 1879.

*To all whom it may concern:*

Be it known that I, THOMAS SMITH, of the township of Westminster, in the county of Middlesex and the Province of Ontario, Dominion of Canada, have invented certain new and useful Improvements on Buggy-Tops; and I do hereby declare that the following is a full, clear, and exact description of the same, reference being had to the accompanying drawings, where—

Figure 1 is a front view, and Fig. 2 a side view, of my invention. Fig. 3 is a detail of bed-plate, &c.

This invention relates to a device for securing and adjusting the top, which, while holding it very firmly in any position in which it may be set, is readily approached and operated from the inside.

The improvement particularly consists in combining with the customary bows circular hinge-plates fitted to turn within flanged supporting-standards and locked by bifurcated latches, which, by embracing the bow and engaging on each side of it in notches in the flanged standards, securely brace and hold the bow in any position in which it may be set.

A is the bed-plate, preferably made circular and supported in an upright position by foot B, which will be screwed to the ends of the seat. This plate A has a projecting rim or flange, and incloses a smaller plate, C, also circular, fitting accurately inside the rim of A, the faces of A and C being in contact and both perfectly smooth.

In Fig. 3 the notches formed in rim of bed-plate are shown, and marked 1 2 3 4. These notches are to receive the jaws D on lower end of lever E, which is pivoted at F to wings G, extending from top of inner plate, C, and in the space between these wings are fastened the lower ends of bows H H, the upper ends of which are attached to the buggy-top. A spring, I, causes the lever E to engage with the notches 1, 2, 3, or 4 in the rim A, thus keeping the top in any position at which it may be set.

It will be apparent that by bifurcating the latch and adapting it to embrace the bow and engage in notches on both sides thereof I provide a very rigid and secure fastening, which holds it inflexibly against motion in either direction.

When the lever is pressed down by the hand the jaws D are released from the notches and the plate C may be turned partially round until the notches formed in them are opposite other notches higher up or lower down, as the case may be, in the rim, and the lever being released the teeth will then enter into these notches and hold the top in the new position.

Other arms, J J, (shown only in Fig. 1,) are pivoted freely to the plate C. The upper ends of these arms are attached to the bows supporting the top, on each side of bows H H.

I am aware that various devices accessible from the inside have been used for supporting and adjusting a buggy-top. This, therefore, I do not broadly claim; but What I do claim as new, and desire to secure by Letters Patent, is—

The combination of the plate A, constructed with an annular flange and with a foot, B, for securing it to the seat, the circular plate C, fitted to rotate within the flange of the plate A, and having rigid upwardly-projecting arms G G, the bow attachments H H, mounted on and turning with the arms G G, and the bifurcated spring latch or lever D E, hinged to the said arms G, and engaging in notches in the plate A, all substantially as and for the purpose set forth.

THOMAS SMITH.

Witnesses:
HENRY BEECH,
JOHN C. MEREDITH.